Jan. 15, 1957 E. W. HAWKINSON 2,777,163
TIRE RETREADING EQUIPMENT
Filed Aug. 31, 1953 2 Sheets-Sheet 2
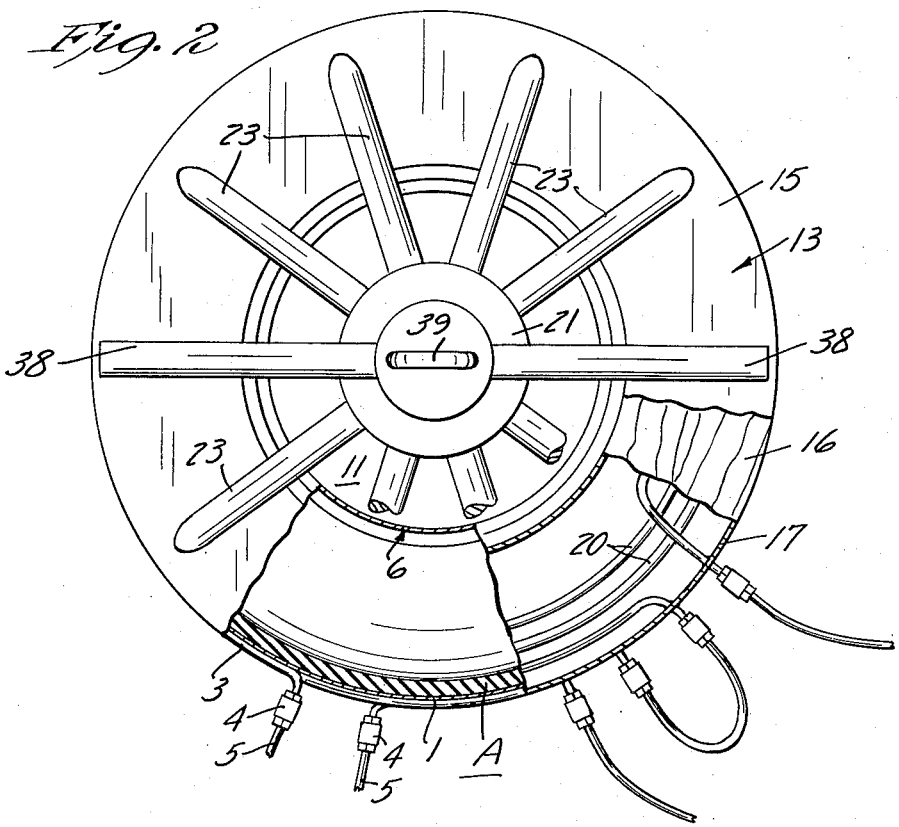
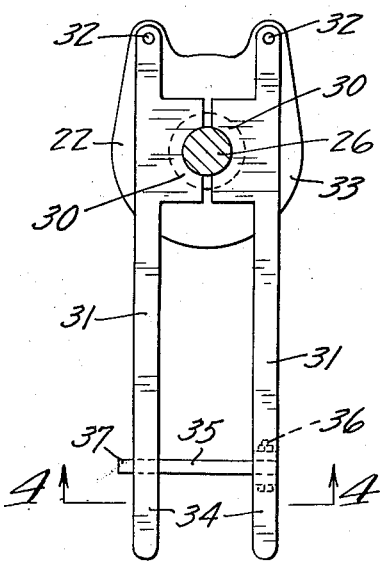
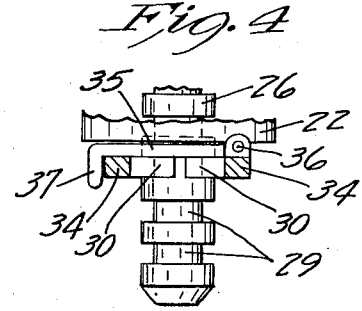
INVENTOR.
Earle W. Hawkinson
BY
Merchant & Merchant
ATTORNEYS

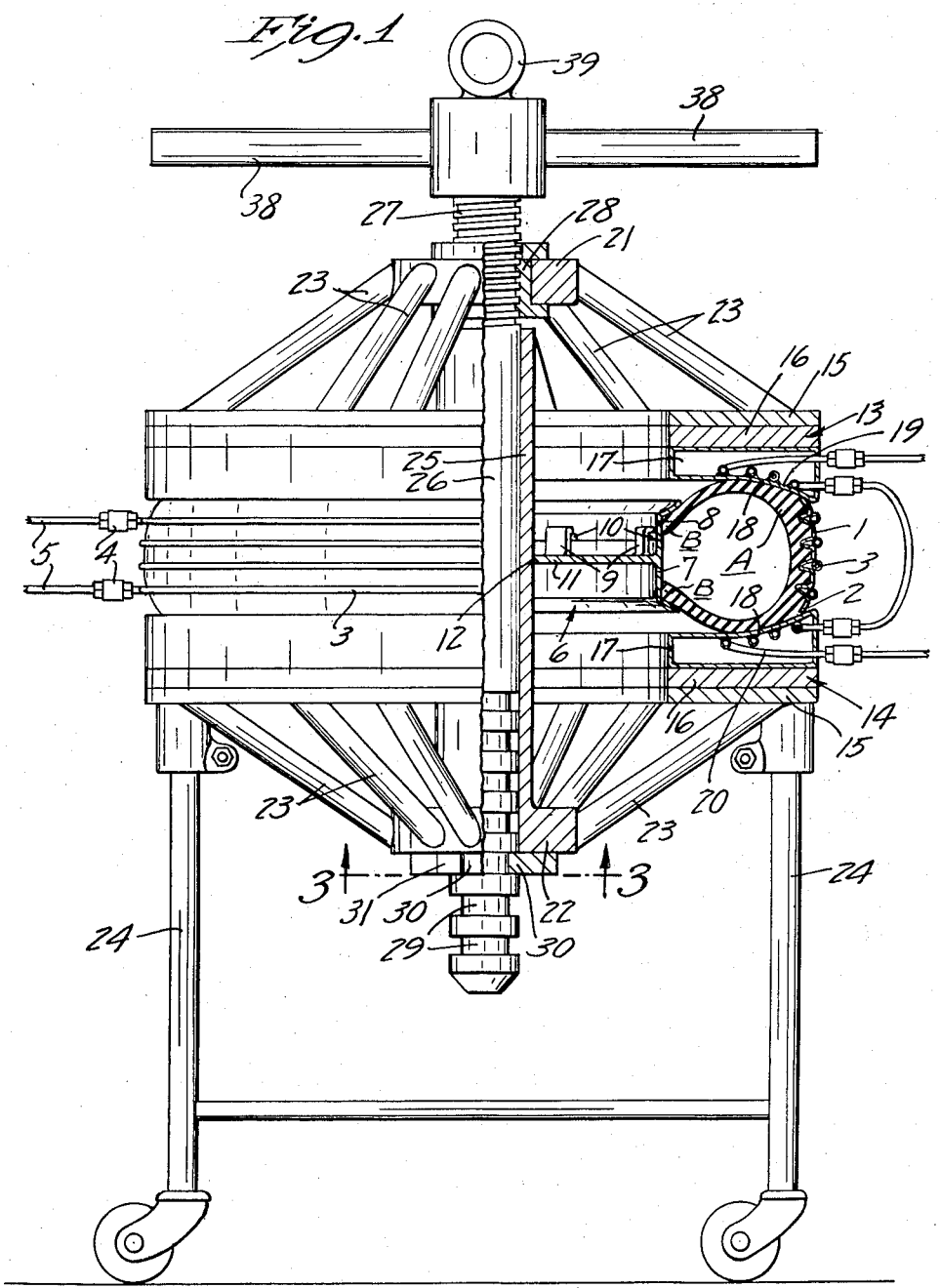

United States Patent Office 2,777,163
Patented Jan. 15, 1957

2,777,163
TIRE RETREADING EQUIPMENT

Earle W. Hawkinson, Minneapolis, Minn., assignor to Paul E. Hawkinson Company, Minneapolis, Minn., a corporation of Minnesota Application August 31, 1953, Serial No. 377,498

1 Claim. (Cl. 18—18)

My invention relates to tire retreading apparatus and, more particularly, to apparatus of the type designed to apply a retread known as a "full cap" as distinguished from a "top cap."

So-called "top capping," where the newly applied rubber is confined substantially to the worn road-engaging crown surface of the tire, has inherent advantages and benefits over "full capping," wherein the newly applied tread rubber extends completely over the shoulders of the tire and feathers off on the side walls thereof. Particularly is this true of the so-called "Hawkinson" type top capping wherein the newly applied rubber is cured to the casing while the casing is in a circumferentially reduced condition so as to approximate rolling radius, see Patents No. 1,917,261 and Re. 21,956. In full capping the molds or matrices in which the tire casings are placed to vulcanize the newly applied tread material are arcuate in cross-section. Consequently, it is extremely difficult to obtain a perfect fit between the tire and the mold. If the tire happens to be too large, buckling of the cord carcass results. On the other hand, if the tire is too small for the mold, a porous cure of the tire results.

The primary object of my invention is the provision of a novel method for applying full caps to pneumatic tire casings wherein all the benefits of the so-called rolling radius top cap but none of the above described detriments of the full cap are assured.

A still further object of my invention is the provision of a device of the class described in which the primary matrix section of which may be formed of sheet metal.

A still further object of the invention is the provision of a device of the class described having a primary annular band-like tread design forming matrix and a pair of independent opposed pressure plates, each of which matrix and pressure plates is provided with independent heating means, whereby the desired limited amount of heat may be applied to the relatively thin rubber at the sides of the tire but a greater amount applied to the relatively thick tread of the tire.

A still further object of my invention is the provision of a device of the class immediately above described wherein one of said pressure plates is provided with legs and acts as a table. Each of said plates is provided with a central head having aligned vertical openings therein, said lower head having an upstanding tubular guide sleeve attached thereto which extends upwardly between the plates, and in further combination with an elongated screw projecting through the openings in said heads and guide sleeve and a rim on the tire being cured in said matrix, said rim having thereon an annular flange, the central opening of which snugly receive the exterior of said guide sleeve so as to uniformly center said tire and the band-like curing ring hereon with respect to the pressure plates.

A still further object of my invention is the provision of novel means for detachably locking said clamping plates against axial movement with respect to each other.

The above and still further objects and advantages of the invention will become apparent from the following detailed specification, appended claim and attached drawings.

Referring to the drawings, wherein like characters indicate like parts throughout the several views:

Fig. 1 is a view partly in side elevation and partly in vertical axial section;

Fig. 2 is a view in top plan, some parts being broken away and some parts being shown in section;

Fig. 3 is a view partly in section and partly in bottom plan taken substantially on the line 3—3 of Fig. 1, with some parts removed; and Fig. 4 is a fragmentary view partly in side elevation and partly in section taken on the line 4—4 of Fig. 3.

Referring with greater particularity to the drawings, the numeral 1 indicates an endless circular matrix section preferably formed from sheet metal in the manner taught by Patent Re. 21,956, except that said matrix 1 is slightly arcuate in cross-section and terminates at its opposite edges 2 without the presence of any tread material confining flanges. A spirally wound tubular steam conduit 3 is secured to the external peripheral surface of matrix section 1 by means of solder or the like and said tube 3 is provided at its opposite ends with steam inlet and outlet nipples 4 for connection to steam lines 5. Matrix section 1 is of less diameter than the normal diameter of a tire A to be cured therein and the tire A is entered thereinto by means of spreading the beads B laterally at circumferentially spaced points to reduce the circumference thereof, all as clearly caught in Patent Re. 21,956.

For the curing operation, the tire A with the matrix section 1 applied thereover is placed within a curing rim identified in its entirety by the numeral 6 and comprising a pair of complementary sections 7 and 8, the former of which is provided with a laterally projecting locking hook 9 which engages a locking lug 10 on the section 8 upon relative rotation of the sections 7 and 8. As shown, the rim section 7 is provided with a horizontally disposed radial flange 11, which has a central opening 12, the function of which will hereinafter become apparent.

Adapted to cooperate with the above described apparatus, I provide a pair of horizontally disposed upper and lower pressure plates 13 and 14, respectively. Each plate includes an annular metallic member 15, an insulator plate 16 and an annular hollow member 17. The opposed faces 18 of the pressure plates 13 and 14 are adapted to engage the side walls of the tire casing A radially inwardly of the matrix section 1 and axially and radially outwardly of the rim 6. It should be noted that the faces 18 are provided with arcuate radially outer portions 19 which are adapted to engage the opposite side edge portions of matrix sections 1 of specifically different diameters and make sealing contact therewith. In other words, the particular matrix section utilizable with a given set of clamping plates 13 and 14 must be of somewhat smaller diameter than the maximum diameter of the clamping plates 13 and 14 but in no case of less diameter than the arcuate portions 19. As shown, the hollow elements 17 of the clamping plates 13 and 14 are provided with independent heating means in the nature of tubular metallic heating coils 20 which may be connected in series, as shown, or to a source of steam under pressure or independently, if desired. Clamping plates 13 and 14, respectively, are provided with central heads 21 and 22 having aligned vertical openings therein. The heads 21 and 22 are offset from the planes of their respective plates 13 and 14 in opposite directions and rigidly connected thereto by means of radiating spider-like arms 23. The lower clamping plate 14 preferably and as shown is provided with caster-wheel-equipped legs 24 to facilitate mobility and to space the head 22 from the ground.

Projecting axially and vertically upwardly from the lower head 22 is a guide sleeve 25 which projects upwardly through the opening in the plates 13 and 14 and snugly through the opening 12 in the annular flange 11 so as to uniformly center the rim 6 and the tire A and the matrix section 1 with respect to the clamping plates 13 and 14. An elongated screw 26 projects through the aligned openings in the heads 21 and 22 and is snugly received within the guide sleeve 25. The screw 26 is provided with threads 27 at its upper end which engage the threads 28 in the upper head 21.

The lower end of the screw 26, which projects below the lower head 22, is provided with a plurality of axially spaced annular grooves 29. Adapted to selectively cooperate with one of the annular grooves 29 to detachably secure the heads 21 and 22 and the plates 13 and 14 respectively carried thereby against axial movement with respect to each other, I provide a split clamping collar 30, each section of which is provided with a laterally projecting handle 31. The inner ends of the handles 31 are pivotally secured as at 32 to the under surface 33 of the lower head 22, whereas the outer ends 34 are retained in locking engagement by means of a latch bar 35 pivotally secured as at 36 to one thereof and having a hooked end 37 which overlies the other thereof.

Preferably and as shown, the upper end of the screw 26 is provided with a handle element 38 to facilitate manual turning thereof. Also an eye 39 is provided to facilitate lifting of the screw 26 and the upper plate 13 vertically by hoist to facilitate placing the tire casing A with the rim 6 and matrix section 1 attached thereto in place upon the lower pressure plate 14 and removing the same therefrom.

My invention has been thoroughly tested and found to be completely satisfactory for the accomplishment of the above objects, and while I have disclosed a preferred embodiment thereof, it should be obvious that the same is capable of modification without departing from the scope of the appended claim.

What I claim is:

In a device of the class described the combination comprising an annular matrix section engageable with the tread portion of a tire casing, an annular curing rim engageable with the bead portions of a tire casing being cured in the matrix section and restraining the bead portions against separation, a pair of opposed annular pressure plates having concave casing engaging faces adapted to engage the side wall portions of a tire casing axially and radially outwardly of said curing rim and engageable with the opposite side edges of the matrix section to form therewith a deep cavity retread mold, said pressure plates having axially aligned openings and each plate having a head portion thereon extending axially outwardly therefrom, an integral guide and centering sleeve extending from one head portion and terminating adjacent the other head portion, a radial flange extending from the curing rim and having a central opening snugly embracing the guide and centering sleeve, an elongated screw extending through said one head portion and having threaded engagement with said other head portion and being detachably mounted in said one head portion, means for rotating said screw, said detachable mounting comprising a plurality of axially spaced annular grooves, a pair of levers pivoted on the outer end of said one head portion, each lever having an arcuate notch intermediate its ends, said notches engageable with selected grooves to provide major adjustments of the screw, and latch means holding the levers in operative position.

References Cited in the file of this patent

UNITED STATES PATENTS

| | | |
|---|---|---|
| 2,065,696 | Hawkinson | Dec. 29, 1936 |
| 2,152,755 | Barnes | Apr. 4, 1939 |
| 2,429,786 | Wright | Oct. 28, 1947 |
| 2,566,797 | Heintz | Sept. 4, 1951 |

FOREIGN PATENTS

| | | |
|---|---|---|
| 137,079 | Australia | May 1, 1950 |
| 915,124 | France | July 16, 1946 |